US009467606B2

(12) United States Patent
Wan et al.

(10) Patent No.: US 9,467,606 B2
(45) Date of Patent: Oct. 11, 2016

(54) WAFER LEVEL STEPPED SENSOR HOLDER

(71) Applicant: OMNIVISION TECHNOLOGIES, INC., Santa Clara, CA (US)

(72) Inventors: Tsung-Wei Wan, Baoshan Township (TW); Jau-Jan Deng, Taipei (TW); Wei-Ping Chen, New Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 4 days.

(21) Appl. No.: 14/301,124

(22) Filed: Jun. 10, 2014

(65) Prior Publication Data
US 2015/0358510 A1    Dec. 10, 2015

(51) Int. Cl.
*H04N 5/225*    (2006.01)

(52) U.S. Cl.
CPC .......... *H04N 5/2254* (2013.01); *H04N 5/2257* (2013.01)

(58) Field of Classification Search
CPC .................................................. H04N 5/2257
See application file for complete search history.

(56) References Cited

U.S. PATENT DOCUMENTS

| | | | |
|---|---|---|---|
| 7,329,861 B2 * | 2/2008 | Ma et al. ...................... 250/239 |
| 7,564,496 B2 * | 7/2009 | Wolterink ............ G02B 13/006 257/432 |
| 8,110,884 B2 * | 2/2012 | Bolken et al. ................ 257/432 |
| 8,361,830 B2 * | 1/2013 | Yang .................... H04N 5/2254 257/433 |
| 8,388,793 B1 * | 3/2013 | Lin et al. ...................... 156/247 |
| 8,547,470 B2 * | 10/2013 | Yano et al. ................... 348/340 |
| 8,866,949 B2 * | 10/2014 | Yano ...................... B32B 37/12 348/294 |
| 2004/0189854 A1 * | 9/2004 | Tsukamoto ............. G02B 7/02 348/340 |
| 2005/0068434 A1 * | 3/2005 | Hatano ......................... 348/272 |
| 2005/0077458 A1 * | 4/2005 | Ma et al. ...................... 250/239 |
| 2005/0185088 A1 * | 8/2005 | Kale et al. .................... 348/374 |
| 2005/0270413 A1 * | 12/2005 | Hatano et al. ................ 348/370 |
| 2006/0028573 A1 * | 2/2006 | Seo et al. ..................... 348/340 |
| 2006/0044450 A1 * | 3/2006 | Wolterink et al. ............ 348/340 |
| 2006/0132644 A1 * | 6/2006 | Shangguan et al. .......... 348/374 |
| 2007/0166029 A1 * | 7/2007 | Lee et al. ...................... 396/529 |
| 2008/0278617 A1 * | 11/2008 | Tanida et al. ................. 348/340 |
| 2009/0068798 A1 * | 3/2009 | Oliver et al. .................. 438/127 |
| 2009/0079863 A1 * | 3/2009 | Aoki .................... G02B 13/001 348/374 |
| 2009/0102959 A1 * | 4/2009 | Chen et al. ................... 348/340 |
| 2009/0267170 A1 * | 10/2009 | Chien et al. .................. 257/434 |

(Continued)

FOREIGN PATENT DOCUMENTS

TW    201123870 A    7/2011

OTHER PUBLICATIONS

Oxford Dictionaries; Bond Definition; p. 4; http://www.oxford-dictionaries.com/us/definition/american_english/bond.*

(Continued)

*Primary Examiner* — Roberto Velez
*Assistant Examiner* — Cynthia Segura
(74) *Attorney, Agent, or Firm* — Blakely, Sokoloff Taylor & Zafman LLP

(57) ABSTRACT

An apparatus includes an image sensor that is bonded to a spacer. The spacer has a thinned wall that defines a step and a recess in an interior wall at a first end of the spacer. The image sensor is bonded to the step within the recess of the spacer such that the image sensor is accepted completely within the recess of the spacer. A glass wafer is mounted on a second end of the spacer. A lens is mounted on the glass wafer such that light is to be directed through the lens to the image sensor.

19 Claims, 4 Drawing Sheets

(56) References Cited

U.S. PATENT DOCUMENTS

| | | | | |
|---|---|---|---|---|
| 2009/0295979 | A1* | 12/2009 | Matsuo | H01L 27/14636 348/335 |
| 2009/0309177 | A1* | 12/2009 | Jeung et al. | 257/432 |
| 2010/0053318 | A1* | 3/2010 | Sasaki | 348/125 |
| 2010/0309368 | A1* | 12/2010 | Choi et al. | 348/360 |
| 2011/0032409 | A1* | 2/2011 | Rossi et al. | 348/340 |
| 2011/0037886 | A1* | 2/2011 | Singh et al. | 348/340 |
| 2011/0037887 | A1 | 2/2011 | Lee et al. | |
| 2011/0050978 | A1* | 3/2011 | Yano | B32B 37/12 348/335 |
| 2011/0051390 | A1* | 3/2011 | Lin et al. | 361/818 |
| 2011/0080487 | A1* | 4/2011 | Venkataraman et al. | 348/218.1 |
| 2011/0149143 | A1* | 6/2011 | Tsujino | 348/374 |
| 2011/0248367 | A1* | 10/2011 | Yang et al. | 257/432 |
| 2012/0002087 | A1* | 1/2012 | Kim | 348/294 |
| 2012/0113318 | A1* | 5/2012 | Galstian | B29D 11/00298 348/374 |
| 2012/0134028 | A1* | 5/2012 | Maruyama | 359/601 |
| 2012/0155854 | A1* | 6/2012 | Huang et al. | 396/535 |
| 2012/0181646 | A1* | 7/2012 | Han et al. | 257/432 |
| 2013/0027602 | A1* | 1/2013 | Kasuga | H04N 5/2257 348/335 |
| 2013/0258181 | A1 | 10/2013 | Leung et al. | |
| 2013/0258182 | A1* | 10/2013 | Lin et al. | 348/374 |
| 2013/0286282 | A1* | 10/2013 | Yamamoto | 348/374 |
| 2013/0320195 | A1 | 12/2013 | Wang et al. | |
| 2014/0267893 | A1* | 9/2014 | Yoshida | H04N 5/2257 348/373 |
| 2015/0116562 | A1* | 4/2015 | Wan et al. | 348/302 |
| 2015/0271372 | A1* | 9/2015 | Sekimoto | G02B 7/08 348/335 |

OTHER PUBLICATIONS

Dictionary.com; Bond Definition; p. 2; http://dictionary.reference.com/browse/bond?s=t.*
TW Application No. 103135720—Taiwanese Office Action and Search Report, with English Translation, issued Aug. 25, 2015 (10 pages).

* cited by examiner

WAFER LEVEL STEPPED SENSOR HOLDER

BACKGROUND INFORMATION

1. Field of the Disclosure

The present invention relates generally to image sensors. More specifically, embodiments of the present invention are related to wafer level camera modules.

2. Background

A wafer level camera module is a camera module that has a small footprint and can be utilized in applications such as for example mobile phones, notebook computers, tablet computers, and the like. A wafer level camera module includes optics to focus an image and an image sensor for sensing the image. In order to capture a high quality image, the optics of the camera module typically includes several lenses that are separated by glass wafers and/or spacers. The lenses are stacked in a lens stack. The lens stack is disposed on an image sensor module. The lens stack and the image sensor module are enclosed within a barrel, which may also be referred to as a holder.

There are continuing efforts to reduce camera module sizes as well as production costs of the manufacturing and assembly of wafer level camera modules. As the number of steps required to assemble a camera module increases, the time required to assemble the camera module increases, which increases the cost to produce the camera modules. Accordingly, a wafer level camera module and wafer level camera module assembly method that may reduce the number of steps to assemble a wafer camera module is desired. Furthermore, wafer level camera modules having fewer parts and a decreased camera module sizes are also desired.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

As will be shown, methods and apparatuses that provide a wafer level camera module including a lens stack having a spacer with a thinned wall that defines a step and a recess that accepts an image sensor in accordance with the teachings of the present invention are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Example methods and apparatuses directed to a wafer level camera module including a lens stack having a spacer with a thinned wall that defines a step and a recess that accepts an image sensor in accordance with the teachings of the present invention are disclosed. As will be appreciated, a wafer level camera module and wafer level camera module assembly method according to the teachings of the present invention may provide wafer level camera modules with reduced size, reduced assembly cycle time, and therefore reduced production costs. In addition, examples of the disclosed wafer level camera modules in accordance with the teachings of the present invention have reduced light leaks, which may be found in typical wafer level camera modules.

Figure 1:
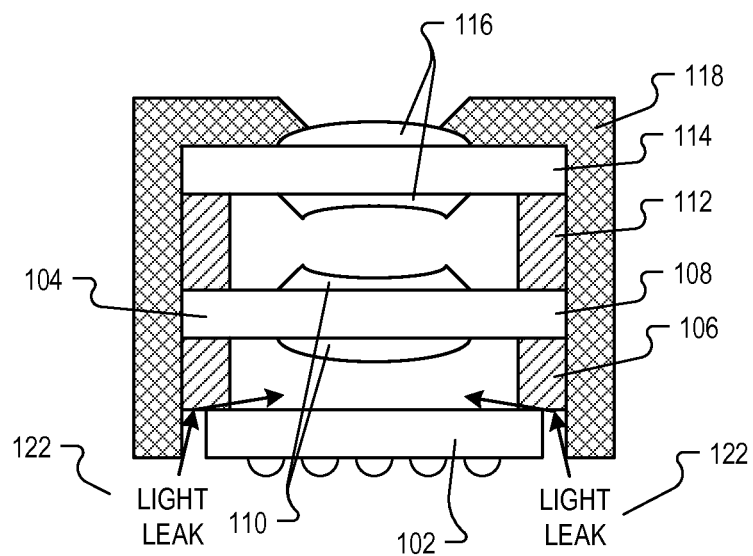
FIG. 1 is an illustration of a typical wafer level camera module.

To illustrate, FIG. 1 is a schematic diagram of a typical wafer level camera module 100. As shown, wafer level camera module 100 includes a lens stack 104 and an image sensor 102. FIG. 1 shows that lens stack 104 includes several lenses 110 and 116 that are separated by glass wafers 108 and 114 and/or spacers 106 and 112. The lens stack 104 is disposed on an image sensor 102. The lens stack 104 in FIG. 1 is held in place with respect to the image sensor 102 by being enclosed within a barrel 118, which may also be referred to as a holder, as shown.

FIG. 1 shows that the lens stack 104 has overhang with respect to the image sensor 102. As the size of the image sensor 102 increases, the size of wafer level camera module 100 increases even further because the barrel 118 or holder adds additional thickness due to the large sidewall thickness of barrel 118. Furthermore, additional assembly steps are required to put the lens stack 104 and image sensor 102 into the barrel 118, which increases the assembly cycle time of wafer camera module 100. Consequently, the inclusion of barrel 118 increases the overall cost of wafer camera module 100. FIG. 1 also illustrates an additional disadvantage with wafer level camera module 100 due to the light leak 122 proximate to the lateral sidewalls of the image sensor 102 next to the overhang of lens stack 104 with respect to the image sensor 102 as shown.

Figure 2:
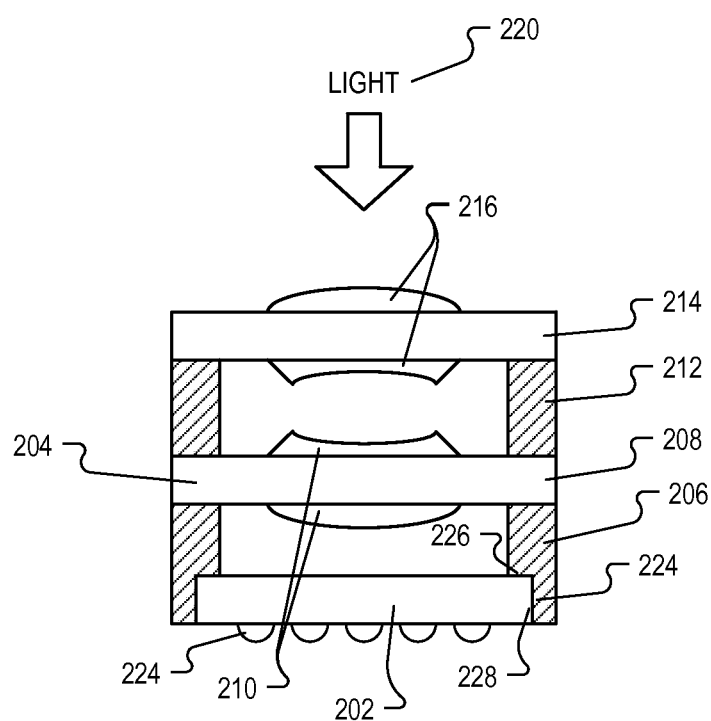
FIG. 2 illustrates one example wafer level camera module including a lens stack having a spacer with a thinned wall that defines a step and a recess that accepts an image sensor in accordance with the teachings of the present invention.

FIG. 2 illustrates one example wafer level camera module 200 in accordance with the teachings of the present invention. In particular, FIG. 2 shows example wafer level camera module 200 including a lens stack 204 having a spacer 206 with a thinned wall 224 that defines a step 226 and a recess 228 that accepts an image sensor 202 in accordance with the teachings of the present invention. As shown in the depicted example, the image sensor 202 is bonded to the step 226 within the recess 228 of the spacer 206 such that the image sensor 202 is accepted completely within the recess 228 of the spacer in accordance with the teachings of the present invention. In one example, a plurality of solder balls 224 is included on image sensor 202 opposite spacer 206 as shown to provide electrical connections to circuitry included within image sensor 202.

As shown in the example depicted in FIG. 2, the image sensor 202 is accepted into the recess 228, which is located at one end of spacer 206 of lens stack 204. In one example, lens stack 204 also includes a glass wafer 208, which is mounted at the opposite end of the spacer 206. In the illustrated example, one or more lenses 210 are mounted on glass wafer 208 as shown. In one example, lens stack 204 also includes another spacer 212, which is mounted to glass wafer 208 such that the glass wafer 208 is disposed between the spacer 206 and spacer 212 as shown. In addition, a glass wafer 214 is mounted on spacer 212 such that spacer 212 is disposed between glass wafer 208 and glass wafer 214 as shown. In the illustrated example, one or more lenses 216 are mounted on glass wafer 214 as shown such that light 220 is directed through the lenses 210 and 216 to the image sensor 202. In one example, spacers 206 and 212 may be built using one or more of resin, plastic, glass, or other suitable material. In one example, the material that is utilized to build the stepped sensor holder provided with spacer 206 may be a different material having a different structure that provides increased strength to hold image sensor 202.

As shown in the example depicted in FIG. 2, since the image sensor 202 is accepted completely within the recess 228 of the spacer 206, the lateral sidewalls of the image sensor 202 are enclosed completely by the thinned wall 224 of the spacer 206. Accordingly, the thinned wall 224 of the spacer 206 blocks completely all light leaks proximate to the lateral sidewalls of the image sensor 202, as compared for example to the light leaks 122 found in wafer level camera module 100 proximate to the lateral sidewalls of the image sensor 102 illustrated in FIG. 1. Furthermore, with image sensor 202 being accepted completely within the recess 228 of the spacer 206 as shown, it is appreciated that the lens stack 204 is therefore attached to the image sensor 202 without a barrel, as compared for example to barrel 118 being needed in wafer level camera module 100 to hold lens stack 104 to image sensor 102 in FIG. 1. Accordingly, benefits that may be provided with wafer level camera module 200 include a reduced module size since a barrel 118 is no longer necessary to hold image sensor 202 to lens stack 204. In addition, the costs of wafer level camera module 200 are reduced because fewer parts and manufacturing steps are needed (e.g., no barrel 118 and associated steps), which allows for simplified manufacturing methods to be utilized to build wafer level camera module 200, such as for example a pick and place automation method, which reduces manufacturing times as well as manufacturing costs.

Figure 3:
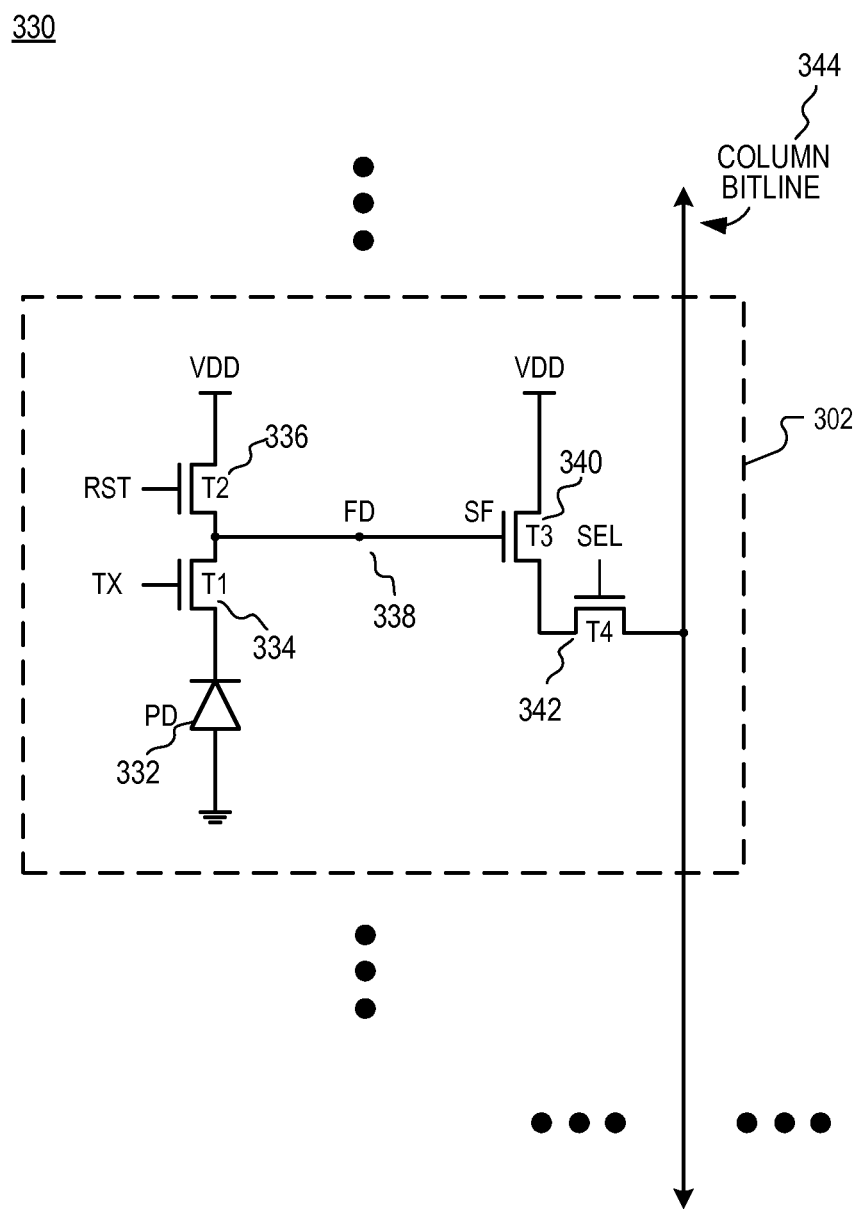
FIG. 3 illustrates an example schematic of a pixel cell included in an example wafer level camera module in accordance with the teachings of the present invention.

FIG. 3 illustrates an example schematic of a pixel cell 330 that may be included in an example wafer level camera module in accordance with the teachings of the present invention. In the depicted example, pixel cell 330 is illustrated as being a four-transistor ("4T") pixel cell included in image sensor in accordance with the teachings of the invention. It is appreciated that pixel cell 330 is one possible example of pixel circuitry architecture for implementing each pixel cell within the image sensor 202 of FIG. 2. However, it should be appreciated that other examples in accordance with the teachings of the present invention are not necessarily limited to 4T pixel architectures. One having ordinary skill in the art having the benefit of the present disclosure will understand that the present teachings are also applicable to 3T designs, 5T designs, and various other pixel architectures in accordance with the teachings of the present invention.

In the example depicted in FIG. 3, pixel cell 330 includes a photodiode ("PD") 332 to accumulate image charge, a transfer transistor T1 334, a reset transistor T2 336, a floating diffusion ("FD") 338, a source-follower ("SF") transistor T3 340, and a select transistor T4 342. During operation, transfer transistor T1 334 receives a transfer signal TX, which transfers the image charge accumulated in photodiode PD 332 to floating diffusion FD 338. In one example, floating diffusion FD 338 may be coupled to a storage capacitor for temporarily storing image charges. As shown in the illustrated example, reset transistor T2 336 is coupled between a power rail VDD and the floating diffusion FD 338 to reset the pixel cell 330 (e.g., discharge or charge the floating diffusion FD 338 and the photodiode PD 332 to a preset voltage) in response to a reset signal RST. The floating diffusion FD 338 is coupled to control the gate of SF transistor T3 340. SF transistor T3 340 is coupled between the power rail VDD and select transistor T4 342. SF transistor T3 340 operates as a source-follower amplifier providing a high impedance connection to the floating diffusion FD 338. Select transistor T4 342 selectively couples the output of pixel cell 330 to the readout column bitline 344 in response to a select signal SEL.

In one example, the TX signal, the RST signal, the SEL signal, and the readout pulse voltage, which is selectively coupled to the deep trench isolation, are generated by control circuitry, an example of which will be described in further detail below. In an example in which the image sensor including pixel cell 330 operates with a global shutter, the global shutter signal is coupled to the gate of each transfer transistor T1 334 in the image sensor to simultaneously commence charge transfer from each pixel's photodiode PD 332. Alternatively, rolling shutter signals may be applied to groups of transfer transistors T1 334 in accordance with the teachings of the present invention.

Figure 4:
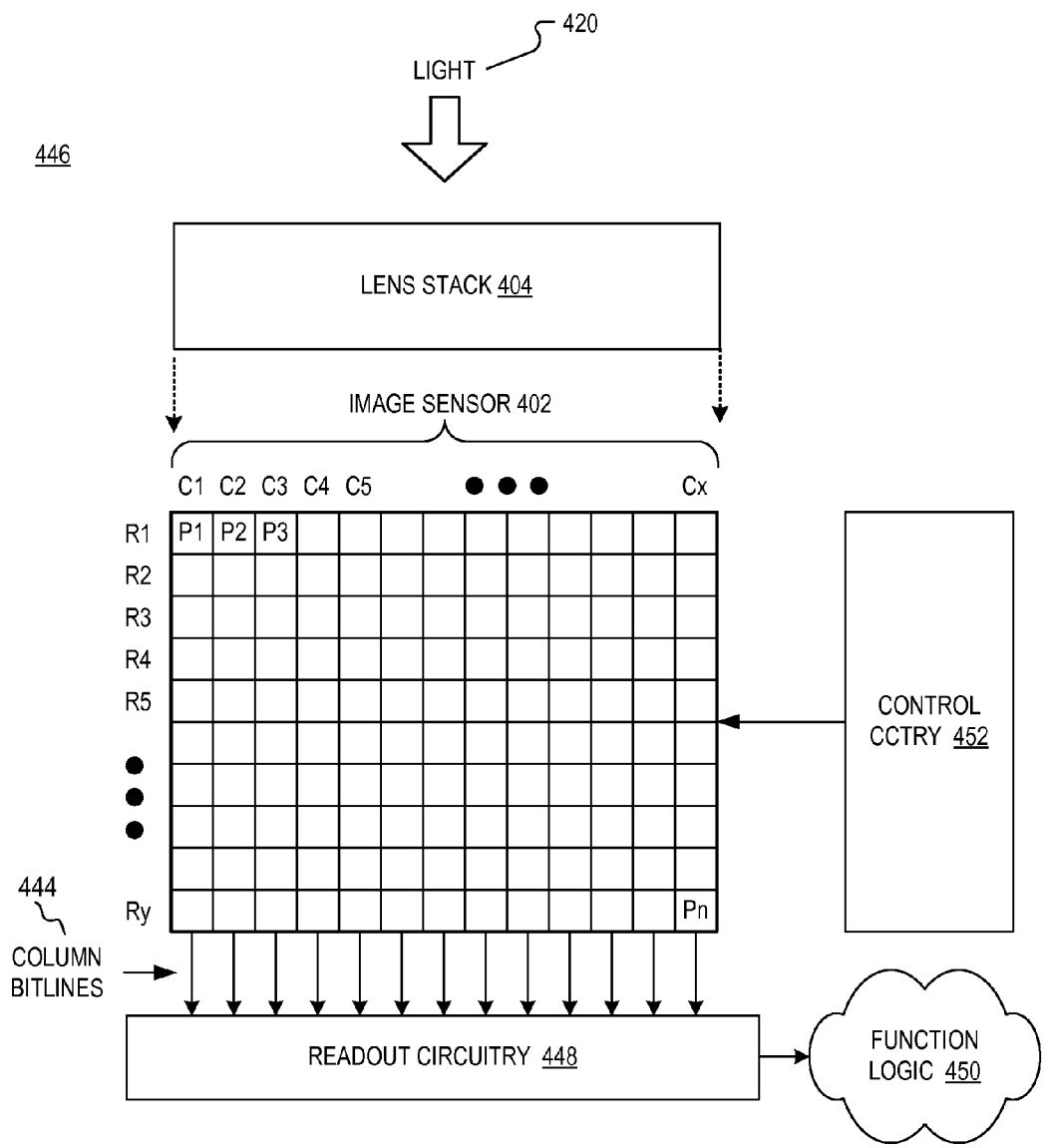
FIG. 4 illustrates an example of an imaging system including an example wafer level camera module including an example lens stack in accordance with the teachings of the present invention.

FIG. 4 illustrates an example of an imaging system 446 including an example wafer level camera module including an example lens stack 404 in accordance with the teachings of the present invention. As shown in the depicted example, imaging system 446 includes image sensor 402 coupled to control circuitry 452 and readout circuitry 448, which is coupled to function logic 450. In the illustrated example, lens stack 404 is mounted over image sensor 402 such that light 420 is directed through lens stack 404 to focus an image onto image sensor 402 in accordance with the teachings of the present invention. In one example, it is appreciated that lens stack 404 of FIG. 4 is an example of lens stack 204 of FIG. 2 and that similarly named and numbered elements referenced below are coupled and function similar to as described above.

In one example, image sensor 402 includes a pixel array that is a two-dimensional (2D) array of pixel cells (e.g., pixel cells P1, P2 . . . , Pn). In one example, each pixel cell is a CMOS imaging pixel. It is noted that the pixel cells P1, P2, . . . Pn in the image sensor 402 may be examples of pixel cell 330 of FIG. 3 and that similarly named and numbered elements referenced below are coupled and function similar to as described above. As illustrated, each pixel cell is arranged into a row (e.g., rows R1 to Ry) and a column (e.g., column C1 to Cx) to acquire image data of a person, place, object, etc., which can then be used to render a 2D image of the person, place, object, etc.

In one example, after each pixel cell has accumulated its image data or image charge, the image data is readout by readout circuitry 448 through readout column bitlines 444 and then transferred to function logic 450. In various examples, readout circuitry 448 may include amplification circuitry, analog-to-digital (ADC) conversion circuitry, or otherwise. Function logic 450 may simply store the image data or even manipulate the image data by applying post image effects (e.g., crop, rotate, remove red eye, adjust brightness, adjust contrast, or otherwise). In one example, readout circuitry 448 may readout a row of image data at a time along readout column bitlines 444 (illustrated) or may readout the image data using a variety of other techniques (not illustrated), such as a serial readout or a full parallel readout of all pixels simultaneously.

In one example, control circuitry 452 is coupled to image sensor 402 to control operational characteristics of image sensor 402. For example, control circuitry 452 may generate a shutter signal for controlling image acquisition. In one example, the shutter signal is a global shutter signal for simultaneously enabling all pixels cells within image sensor 402 to simultaneously capture their respective image data during a single acquisition window. In another example, the shutter signal is a rolling shutter signal such that each row, column, or group of pixels is sequentially enabled during consecutive acquisition windows.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An apparatus comprising:
    an image sensor;
    a spacer having a thinned wall that defines a step and a recess in an interior wall at a first end of the spacer, wherein the image sensor is bonded to the step within the recess of the spacer such that the image sensor is accepted completely within the recess of the spacer and wherein lateral sidewalls of the image sensor are enclosed completely by the thinned wall of the spacer such that the thinned wall of the spacer blocks completely all light leaks proximate to the lateral sidewalls of the image sensor;
    a glass wafer mounted on a second end of the spacer; and
    a lens mounted on the glass wafer, wherein light is to be directed through the lens to the image sensor.

2. The apparatus of claim 1 further comprising a plurality of solder balls mounted to the image sensor on a side of the image sensor opposite the spacer.

3. The apparatus of claim 1 wherein the spacer is a first spacer, the glass wafer is a first glass wafer, and the lens is a first lens, wherein the apparatus further comprises:
    a second spacer mounted to the first glass wafer such that the first glass wafer is disposed between the first spacer and the second spacer;
    a second glass wafer mounted to the second spacer such that the second spacer is disposed between the first glass wafer and the second glass wafer; and
    a second lens mounted on the second glass wafer, wherein light is to be directed through the second lens and the first lens to the image sensor.

4. The apparatus of claim 3 wherein the first and second lenses are two of a plurality of lenses mounted to the first and second glass wafers.

5. The apparatus of claim 1 wherein the spacer comprises at least one of resin, plastic and glass.

6. The apparatus of claim 1 wherein the spacer, the glass wafer and the lens are included in a lens stack, wherein the lens stack is attached to the image sensor without a barrel.

7. An imaging system, comprising:
    an image sensor including a pixel array having a plurality of pixel cells arranged therein;
    a spacer having a thinned wall that defines a step and a recess in an interior wall at a first end of the spacer, wherein the image sensor is bonded to the step within the recess of the spacer such that the image sensor is accepted completely within the recess of the spacer, and wherein lateral sidewalls of the image sensor are enclosed completely by the thinned wall of the spacer such that the thinned wall of the spacer blocks completely all light leaks proximate to the lateral sidewalls of the image sensor;
    a glass wafer mounted on a second end of the spacer; and
    a lens mounted on the glass wafer, wherein light is to be directed through the lens to the image sensor;
    control circuitry coupled to the pixel array to control operation of the pixel array; and
    readout circuitry coupled to the pixel array to readout image data from the plurality of pixel cells.

8. The imaging system of claim 7 further comprising function logic coupled to the readout circuitry to store the image data readout from the plurality of pixel cells.

9. The imaging system of claim 7 further comprising a plurality of solder balls mounted to the image sensor on a side of the image sensor opposite the spacer.

10. The imaging system of claim 7 wherein the spacer is a first spacer, the glass wafer is a first glass wafer, and the lens is a first lens, wherein the apparatus further comprises:
    a second spacer mounted to the first glass wafer such that the first glass wafer is disposed between the first spacer and the second spacer;
    a second glass wafer mounted to the second spacer such that the second spacer is disposed between the first glass wafer and the second glass wafer; and
    a second lens mounted on the second glass wafer, wherein light is to be directed through the second lens and the first lens to the image sensor.

11. The imaging system of claim 10 wherein the first and second lenses are two of a plurality of lenses mounted to the first and second glass wafers.

12. The imaging system of claim 7 wherein the spacer comprises at least one of resin, plastic and glass.

13. The imaging system of claim 7 wherein the spacer, the glass wafer and the lens are included in a lens stack, wherein the lens stack is attached to the image sensor without a barrel.

14. A method for fabricating an apparatus, the method comprising:
   forming a spacer having a thinned wall that defines a step and a recess in an interior wall at a first end of the spacer;
   bonding an image sensor to the step within the recess, wherein the image sensor is accepted completely within the recess of the spacer and wherein lateral sidewalls of the image sensor are enclosed completely by the thinned wall of the spacer such that the thinned wall of the spacer blocks completely all light leaks proximate to the lateral sidewalls of the image sensor;
   mounting a glass wafer on a second end of the spacer;
   mounting a lens on the glass wafer, wherein light is to be directed through the lens to the image sensor.

15. The method of claim 14 further comprising a plurality of solder balls mounted to the image sensor on a side of the image sensor opposite the spacer.

16. The method of claim 14 wherein the spacer is a first spacer, the glass wafer is a first glass wafer, and the lens is a first lens, wherein the method further comprises:
   mounting a second spacer to the first glass wafer such that the first glass wafer is disposed between the first spacer and the second spacer;
   mounting a second glass wafer to the second spacer such that the second spacer is disposed between the first glass wafer and the second glass wafer; and
   mounting a second lens on the second glass wafer, wherein light is to be directed through the second lens and the first lens to the image sensor.

17. The method of claim 16 wherein the first and second lenses are two of a plurality of lenses mounted to the first and second glass wafers.

18. The method of claim 14 wherein the spacer comprises at least one of resin, plastic and glass.

19. The method of claim 14 wherein the spacer, the glass wafer and the lens are included in a lens stack, and wherein the method further comprises attaching the lens stack to the image sensor without a barrel.

* * * * *